(12) United States Patent
Lewis

(10) Patent No.: US 9,651,308 B1
(45) Date of Patent: May 16, 2017

(54) HIGH TEMPERATURE DEHUMIDIFICATION DRYING SYSTEM

(71) Applicant: Donald C. Lewis, Brewer, ME (US)

(72) Inventor: Donald C. Lewis, Brewer, ME (US)

( * ) Notice: Subject to any disclaimer, the term of this patent is extended or adjusted under 35 U.S.C. 154(b) by 0 days.

(21) Appl. No.: 15/259,658

(22) Filed: Sep. 8, 2016

(51) Int. Cl.
*F26B 23/00* (2006.01)
*F26B 3/04* (2006.01)
*F26B 9/06* (2006.01)
*C09K 5/04* (2006.01)

(52) U.S. Cl.
CPC ............ *F26B 23/005* (2013.01); *C09K 5/045* (2013.01); *F26B 3/04* (2013.01); *F26B 9/06* (2013.01); *C09K 2205/122* (2013.01); *C09K 2205/126* (2013.01); *F26B 2210/16* (2013.01)

(58) Field of Classification Search
CPC .. F26B 23/005; F26B 3/04; F26B 9/06; F26B 2210/16; C09K 5/045; C09K 2205/126; C09K 2205/122
See application file for complete search history.

(56) References Cited

U.S. PATENT DOCUMENTS

| | | |
|---|---|---|
| 1,339,374 A | 5/1920 | Buensod |
| 1,467,306 A | 9/1923 | Carrier |
| 1,497,362 A | 6/1924 | Dhe' |
| 2,318,027 A | 5/1943 | Sykes et al. |
| 2,627,669 A | 2/1953 | Candor |
| 2,920,398 A | 1/1960 | Liljenstrom |
| 3,064,358 A | 11/1962 | Gluffre |
| 3,337,967 A | 8/1967 | Smith |
| 3,940,860 A | 3/1976 | Unterreiner |
| 4,196,526 A | 4/1980 | Berti |
| 4,205,456 A | 6/1980 | Ayers et al. |
| 4,250,629 A | 2/1981 | Lewis |
| 4,432,147 A | 2/1984 | Chen et al. |
| RE31,633 E | 7/1984 | Lewis |
| 4,603,489 A | 8/1986 | Goldberg |
| 5,343,632 A | 9/1994 | Dinh |
| 5,662,825 A | 9/1997 | Bivens et al. |
| 2003/0208923 A1 | 11/2003 | Lewis |
| 2006/0179676 A1* | 8/2006 | Goldberg ............... D06F 25/00 34/77 |

* cited by examiner

*Primary Examiner* — Jiping Lu
(74) *Attorney, Agent, or Firm* — Anthony D. Pellegrini

(57) ABSTRACT

A dehumidification dryer configured and operated so at to achieve higher drying temperatures than traditionally obtainable with dehumidification driers. The invention takes advantage of refrigerants not previously used in the field of dehumidification drying to achieve temperatures in the range of 240 degrees Fahrenheit-260 degrees Fahrenheit that previously were found only in open hot air kilns. In order to make optimum use of high temperature refrigerants, the invention uses variable control rates for drying the air that is used as the drying medium, and restructures the deployment of the components of the refrigeration circuit that participates in the heat and humidity exchange central to the operation of the drier.

18 Claims, 2 Drawing Sheets

HIGH TEMPERATURE DEHUMIDIFICATION DRYING SYSTEM

BACKGROUND OF THE INVENTION

1. Technical Field

The present invention relates generally to systems for drying objects and materials. In particular, the present invention relates to such systems that employ heat exchangers incorporating refrigeration cycles such that only minimal heat and water vapor are exhausted to the ambient atmosphere. More particularly, the present invention is directed at providing such systems that can operate at drying temperatures considerably higher than has been possible heretofore for dehumidification dryers. More particularly yet, the present invention is directed at providing such systems in which the objects and materials to be dried can be maintained during the drying process at temperatures at least as high as 250 degrees Fahrenheit.

2. Description of Prior Art

Although all drying involves "dehumidification" of the object to be dried, the term is used in the industry to refer to systems that heat the objects to be dried by circulating a hot, relatively dry atmosphere past and through them, and then conveying that atmosphere into a dewatering region for drying before re-introducing it to the objects to be dried. In this way, the drying atmosphere arrives in the drying region with relatively low humidity and leaves it containing water vapor evaporated from the objects to be dried. Dehumidification dryers are generally closed systems, in contrast to drying systems where the objects to be dried are simply heated to a high temperature and the resulting gaseous water (a "greenhouse gas") are vented into the ambient atmosphere along with volatile organic compounds (VOCs) and other pollutants. Also, being closed systems, dehumidification dryers do not discard the large quantities of heat (energy) that are vented by traditional systems, and hence consume considerably less fuel.

In the field of industrial drying, the use of refrigeration apparatus as an integral part of dehumidification equipment is well known. The dewatering process typically draws the warm, humid air departing the drying region across a refrigeration coil through which liquid refrigerant is circulated. Heat is conveyed from the warm moist air past the coil, where this heat is transferred to the refrigerant, serving as the heat of vaporization that converts the liquid refrigerant into a gas. For this reason, the coil is referred to as the "evaporator" portion of the refrigeration circuit, or simply, the evaporator.

Overall, the refrigeration circuit includes the evaporator followed by a compressor, where the now-gaseous refrigerant is compressed, and a condenser, where the refrigerant's heat of vaporization is shed and the refrigerant is reconverted to a liquid. In order for the drying atmosphere to be dewatered, its temperature must be cooled at the evaporator to a temperature below the dew point of the moisture laden air. Once it has passed that point, it is reheated before being returned to the object to be dried, the reheating being done in whole or in part by the heat coming off the refrigeration circuit's compressor.

Despite the efficiencies and other desirable features offered by dehumidification dryers, they have had relatively limited use in large-scale drying, specifically in the lumber industry. This is because of the limitations on the operating temperatures hitherto attainable by dehumidification dryers. Certain species of wood, such as softwoods, require drying temperatures in excess of 250° F. for commercially efficient drying (lower temperatures may be used, but the drying time is far longer and can lead to degradation of the product, and thus are undesirable). For temperatures demanded for these commercial drying operations the available refrigerants break down chemically or become ineffective for other reasons, including the high pressures they rise to upon receiving drying atmospheres at these high temperatures, to the point where the resulting load placed on the compressor motor causes that motor to fail. For these reasons, straight dehumidification dryers were limited to a maximum drying temperature of about 180 degrees Fahrenheit, whereby they were precluded from use in a large number of drying operations.

The phrase "straight dehumidification" refers to a system whereby all of the atmosphere (air) leaving the drying region is passed over the evaporator for dewatering. If the temperature of that air upon arriving at the evaporator exceeds about 120° F., the heat that must be transferred to the refrigerant in order to lower the air's temperature to its dew point causes a breakdown of the refrigeration sequence, for the reasons just stated. This problem was partially alleviated by the modifications taught by Lewis, U.S. Pat. Re. 31,633 (1984), (hereinafter, "Lewis (1984)"), which coupled a feedback mechanism to an air-diverting scheme, whereby the volume of air being introduced to the refrigeration unit per unit time is varied as a function of the leaving air or refrigerant temperature. By putting a cap on the amount of heat being dumped into the refrigerant, the drying atmosphere (and hence the objects to be dried) could be raised to higher temperatures, i.e., as high as 160 degrees Fahrenheit. However, Lewis (1984) failed to separate the dehumidifying unit from the drying chamber, thereby preventing the use of higher temperature refrigerants. This problem was then alleviated to some extent by the additional modifications taught by Lewis, U.S. patent application Ser. No. 10/402,007 (2003) (hereinafter, "Lewis (2003)"), which taught the use of an improved refrigerant which could operate at temperatures of up to 225 degrees Fahrenheit in conjunction with locating the dehumidifying unit outside the drying chamber. This was still too low for certain drying needs, though.

A feature of both the Lewis (1984) and the Lewis (2003) drying apparatuses is that the air-intake to the dewatering region includes a mechanism for variably diverting a fraction of the air coming from the drying region, so that that fraction does not come into contact with the coil. The goal is to keep the temperature of the refrigerant or air leaving the coil below a pre-defined level. This is done by coupling the diversion mechanism to a sensor monitoring the temperature directly, or monitoring some surrogate for it. When the monitored temperature exceeds its preset maximum, an increased fraction of the humid air coming from the drying region is diverted around the coil, thus reducing the heat load that the coil has to handle. The systems of Lewis (1884) and Lewis (2003) therefore permit higher drying temperatures to be used while retaining the advantages of the closed-system dehumidifier. In addition to permitting higher drying temperatures, it allows a much more efficient use of "cooling" energy toward the end of the drying regime, when the humid air is far less humid that at the outset of the regime. During that stage in the drying, the difference between the air temperature and the dew point may be quite large with the result that in order to condense water out of that air, it is necessary to lower the temperature of the air many degrees. In this case, even if the temperature of the air exiting the drying region does not exceed the maximum operating temperature of the refrigerant, straight dehumidification schemes may not work, simply because the circuit is unable to remove enough heat to lower the temperature of the complete flux of the drying atmosphere below that atmosphere's dew point. If the air flows past the evaporator without being lowered in temperature below its dew point, it emerges with the same absolute humidity that it had upon entry and consequently will serve no further drying function upon being reheated and directed across the object to be dried. Under these circumstances, the diversion systems of Lewis (1984) and Lewis (2003) again provide an advantage. By permitting just a small fraction of the total drying-atmosphere flux to contact the evaporator coil, that fraction can be reduced to below its dew point and hence dewatered. This will result in an overall reduction of humidity of the entire flux of the air once it has been reunited for its next pass across the objects to be dried. This not only allows the conventional drying schedules for some woods to be met with a dehumidification drying system, but allows all substances to be dried in dramatically shortened times, and without the costs in energy and pollution that are associated with open systems. The system of Lewis (1984) permits drying temperatures as high as 160 degrees Fahrenheit to be reached while using conventional refrigerants at pressures used in conventional refrigeration equipment, while the improved system of Lewis (2003) permits drying temperatures as high as 225 degrees Fahrenheit to be reached while using high-temperature refrigerants at pressures used in conventional refrigeration equipment.

Even though dehumidification dryers at drying temperatures as high as 225 degrees Fahrenheit represent a great improvement, there still remain certain woods, such as Southern Yellow Pine (the common name for the species *Pinus taeda, Pinus palustris, Pinus echinata,* and *Pinus elliottii*), that require even higher temperatures at least in some portion of their normal drying schedules. For example, Southern Yellow Pine is best dried at temperatures of between 240 degrees Fahrenheit 260 degrees Fahrenheit. Even for materials that do not require the higher temperatures, the drying speed is normally increased by using higher temperatures. That is, whenever the drying temperature is increased, the rate of drying available for all objects to be dried goes up dramatically, regardless of whether they require the high temperatures to permit them to be dried in accord with a conventional drying schedule. Given the exigencies related to minimizing all kinds of pollution and maintaining energy efficiency, any improvement in drying systems must involve closed systems or systems considerably more closed that the conventional ones, regardless of its detailed structure and operation. Although closed-system commercial wood dryers incorporating a refrigeration circuit do exist, they have not been able to be operated at the higher temperatures available to open wood drying systems.

Therefore, what is needed is a closed drying system that permits drying temperatures significantly above 225 degrees Fahrenheit to be maintained. What is also needed is such a closed drying system that can be incorporated relatively easily into existing closed-system drying apparatus, and in particular to dehumidification dryers.

It is therefore an object of the present invention to provide a closed drying system that permits drying temperatures significantly above 225 degrees Fahrenheit to be maintained.

Another object of the present invention is to provide a closed drying system that can be incorporated relatively easily into existing drying apparatuses.

Other objects and advantages of the present invention will become obvious to the reader and it is intended that these objects and advantages are within the scope of the present invention. To the accomplishment of the above and related objects, this invention may be embodied in the form illustrated in the accompanying drawings. Attention is called to the fact, however, that the drawings are illustrative only, and that changes may be made in the specific construction illustrated and described within the scope of this disclosure.

SUMMARY OF THE INVENTION

The present invention is an improvement over the dehumidification dryer taught by Lewis (1984), which issued to and was owned by the present inventor and is hereby incorporated into the present specification. The present invention is further an improvement over the dehumidification dryer taught by Lewis (2003), which was applied for and was owned by the present inventor and is also hereby incorporated into the present specification.

The stated objectives of the present invention are met by modifying the current dehumidification drying systems so that they can tolerate significantly higher temperatures, and then by elevating the drying region to higher temperatures. Making the systems tolerant involves two steps. The first is to move out of the drying enclosure those components that can be harmed by exposure to temperatures in excess of 225 degrees Fahrenheit. The second is to replace the present refrigerants with a refrigerant that can function at temperatures well above 225 degrees Fahrenheit. This means that the refrigerant will not break down at those temperatures and that its critical pressure is relatively low. The refrigerants that have been available to dehumidifier driers traditionally have been of a nature that they would break down at these temperatures, ceasing to act as an efficient refrigerant and/or causing other problems such as pressure rises at the compressor such that the compressor motors would overload and burn out.

The invention introduces into the field of dehumidification drying R245fa (1,1,1,3,3-pentafluoropropane) and similar classes of refrigerants, for example, Chemours Company's Opteon MZZ™ (R1336mzzZ) ((Z)-1,1,1,4,4,4-hexaflouro-2-butene) and R1336mzz-E ((E)-1,1,1,4,4,4-hexaflouro-2-butene). R245fa is a refrigerant with good high-temperature performance properties. It has a high critical temperature (309.29 degrees Fahrenheit) and a relatively low critical pressure (less than 400 p.s.i.), making it ideal for use in a refrigeration circuit dedicated to cooling air from initial temperatures far higher than 225 degrees Fahrenheit, and yet retaining the same refrigeration circuit components that are in use in presently existing dryers. Indeed, when used in a dehumidification kiln, one of the embodiments of the present invention, the objects to be dried can be maintained at 250 degrees Fahrenheit or even higher, temperatures required by certain conventional drying schedules, for example, for Southern Yellow Pine dimensioned (construction) lumber.

In order to make use of high-temperature refrigerants and so obtain the above-described advantages, a number of changes must be made to the traditional dehumidification dryer. The most important of these relate to protecting the components of the traditional system that cannot tolerate the higher temperatures associated with the new systems. Traditionally, and as may be seen in FIG. 1 of Lewis (1984), all of the components were contained within a single enclosure, with little thermal isolation of the various components of the refrigeration cycle from the drying region. For the higher temperature operations that are the target of the present invention, the temperature-sensitive components need to be thermally isolated from the drying region, either by insulating them at their present positions within the main enclosure, or by removing them completely from the enclosure and introducing piping and other linkage necessary for them to carry out their functions. In the latter case, there are two separate chambers thermally isolated from one another: the drying chamber and the dewatering chamber.

Because of the inherent advantage of the split-flow/feedback method taught by Lewis (1984), that approach is retained in the new design, modified to reflect the needs imposed by the higher temperatures in and around the drying chamber. Indeed, the new system includes a number of features of the traditional dehumidification dryers as modified by Lewis (1984). This includes the variant of placing a blower proximate to the condenser for the purpose of enhancing the movement of the drying atmosphere through the dewatering region. Also, depending on particular needs, a heating coil may be placed within the high-temperature enclosure to supplement the heat that the drying atmosphere receives from the condenser so as to further raise the temperature of that atmosphere before it is returned to the objects being dried. Moreover, additional fans and/or blowers may be used to further the circulation of the drying atmosphere between the drying region and the dewatering chamber.

However, because the temperatures used by the refrigeration circuit of the present invention are so high, additional modifications must be made beyond those disclosed by Lewis (1984). This is because, even after the refrigerant is condensed into a liquid by the condenser (giving off a considerable amount of heat energy in the process), it still retains a significant amount of heat energy (as much as 25% of the cooling capacity of the system). The principle modification of the present invention, therefore, is to incorporate a pair of sub-coolers within the refrigeration circuit, downstream from the condenser but upstream from an expansion device (an expansion device reduces the pressure of the refrigerant just prior to it being reintroduced to the evaporator, as is well known in the art; for example, the expansion device may comprise an electronic expansion valve or a mechanical expansion valve). The use of sub-coolers is necessary because the expansion device cannot adequately vaporize the refrigerant while it contains too much heat energy. While the use of sub-coolers in general is known in the art, for this very purpose, the specific configuration disclosed in the present invention is not. Namely, the first sub-cooler is located within the dewatering chamber. This sub-cooler reduces the heat of the refrigerant by dissipating it, but rather than discharging it as waste heat (which is how sub-coolers typically are configured, because the purpose of the evaporator is to provide cooling, not dewatering, so excess heat is undesirable), the excess heat dissipated by the first sub-cooler in the present invention is not wasted; instead, it is transferred back into the drying chamber to help maintain the higher temperatures for drying the material.

Care is needed, though, not to overheat the dewatering chamber—if the temperature therein exceeds the working capacity of the evaporator, no further water removal can take place. By using a high temperature refrigerant, there may be so much heat energy remaining in the refrigerant even after heat is dissipated by the first sub-cooler that extracting that excess heat into the drying chamber would result in inefficient dewatering. Therefore, any additional remaining heat needed to be removed from the refrigerant prior to its going through the expansion device is removed by a second sub-cooler. The second sub-cooler is located outside the dewatering chamber, so any excess heat given off by it is kept out of the dewatering chamber, thus preventing the temperature therein from exceeding optimal operational limits. Moreover, the second sub-cooler is reactive to the expansion device, so that only the amount of heat needed to be removed from the refrigerant for proper operation of the expansion device is removed by the second sub-cooler. If the temperature of the refrigerant after passing through the first sub-cooler is sufficiently low such that the expansion device can operate properly, the second sub-cooler will not remove any further heat from the refrigerant (this typically is the case during startup of the system). This configuration allows the system to operate at the highest efficiency, using every bit of excess heat energy without any waste of heat that may otherwise be used to help maintain the temperatures within the drying chamber.

Various other objects, features and attendant advantages of the present invention will become fully appreciated as the same becomes better understood when considered in conjunction with the accompanying drawings.

DETAILED DESCRIPTION OF THE INVENTION

Figure 1:
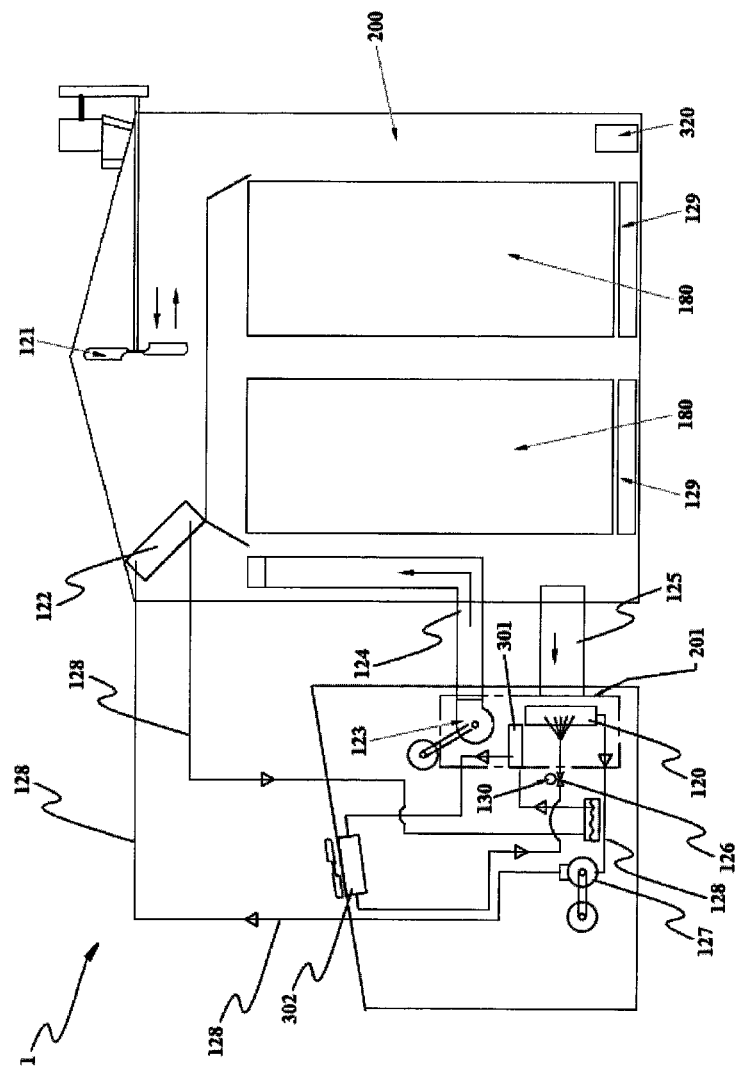
FIG. 1 depicts a schematic view of the preferred embodiment of the present invention used as a kiln for drying lumber.
Figure 2:
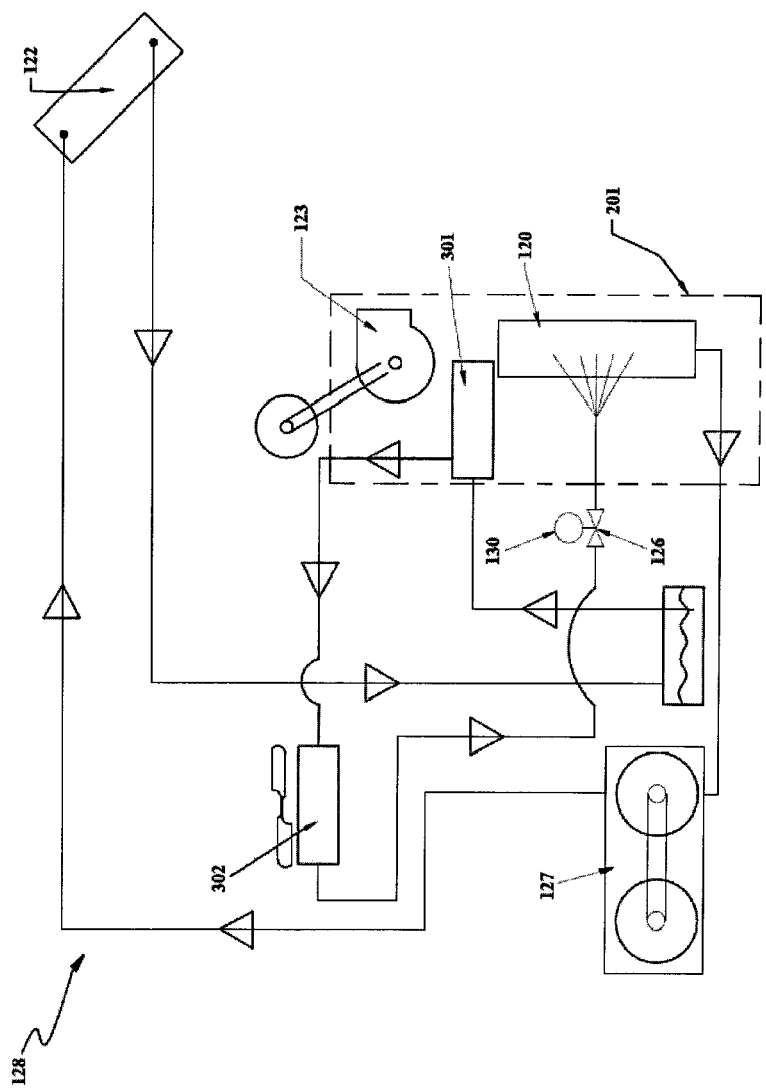
FIG. 2 depicts a schematic detailed view of the refrigeration circuit shown in FIG. 1.

The invention of the present invention is a high temperature dehumidification drying system 1 comprising a high-temperature enclosure (also referred to as the drying chamber) 200, a dewatering enclosure (also referred to as the dewatering chamber) 201, and a refrigeration circuit 128. See FIG. 1. The high-temperature enclosure 200 is kept apart from the dewatering enclosure 201, while the refrigeration circuit 128 connects them. Heated air is transferred back and forth between the high-temperature enclosure 200 and the dewatering enclosure 201, with moisture laden air moving from the high-temperature enclosure 200 to the dewatering enclosure 201 and dry air moving from the dewatering enclosure 201 to the high-temperature enclosure 200. The moisture is removed from the air by the refrigeration circuit 128. In one embodiment, the dewatering enclosure 201 is located within the high-temperature enclosure 200; it is "kept apart" from the high-temperature enclosure 200 by being insulated. In the preferred embodiment the dewatering enclosure 201 is located outside the high-temperature enclosure 200 and is thus physically separated from the high-temperature enclosure 200.

In the preferred embodiment of the present invention, the high-temperature enclosure 200 contains a drying region and the dewatering enclosure 201 contains an evaporator coil 120. The evaporator coil 120 is part of a refrigeration circuit 128, of which the other major elements are a compressor 127, a condenser 122, a first sub-cooler 301, a second sub-cooler 302, and an expansion device 126. Objects to be dried are contained in the high-temperature enclosure 200 within the drying region but, in contrast to previous dehumidification dryers, most of the refrigeration circuit 128 is not contained therein. The compressor 127 is located at some distance from both the high-temperature enclosure 200 and the dewatering enclosure 201. A diverter blower 123 draws moist, heated air from the high-temperature enclosure 200 through an exit duct 125 and past the evaporator coil 120. Once past the blower 123, the air, now dewatered, is returned to the high-temperature enclosure 200 through a return duct 124 which provides a communication between the dewatering enclosure 201 and the high-temperature enclosure 200. The diverter blower 123 may have a variable speed that is controlled by temperature-sensing monitors in a manner similar to that of the system disclosed by Lewis (1984).

The approach just described for establishing the flux of air past the evaporator coil 120 is that of the preferred embodiment. Other embodiments of the invention make use of other mechanisms for determining how much of the air from the high-temperature enclosure 200 passes by the evaporator coil 120 per unit time. Indeed, all of the details that are provided in this section relate to the preferred embodiment and should not be taken to be general features of the invention, which can take many specific forms.

The preferred embodiment being a kiln, the high-temperature enclosure 200 is of sufficient size to receive one or more stacks of lumber, represented in FIG. 1 by two stacks of lumber 180 supported by pallets 129.

With continuing reference to FIG. 1, air is received into the high-temperature enclosure 200 from the return duct 124 and then circulated around and through the lumber 180. Driving this circulation within the high-temperature enclosure 200 is an array of circulation fans 121 mounted on a linear shaft that is driven from without the high-temperature enclosure 200. As the air moves in a general circular motion throughout the high-temperature enclosure 200, a certain fraction of it is being pulled out through the exit duct 125 and thence to the dewatering enclosure 201 and the evaporator coil 120.

As air is circulated within the high-temperature enclosure 200 as described, it receives heat from the condenser 122 that makes up part of the refrigeration circuit 128. In this manner, heat is continually reintroduced into that environment to compensate for the heat removed from that part of it that is diverted through exit duct 125 onto the evaporator coil 120 and thus cooled and dried. As stated, the flux of air per unit time that is cooled and dried is determined by the speed of the diverter blower 123. Thus, the fraction of the total air circulating in the high-temperature enclosure 200 that flows over the evaporator coil 120 is completely controlled by the speed of the diverter blower 123, in the preferred embodiment. However, it is because of this manner of determining fractional flow over the evaporator coil 120 that the condenser 122 is located in this preferred embodiment near the circulation fans 121.

In the prior-art embodiment depicted in FIG. 1 of Lewis (1984), the evaporator temperature sensor is located in the air path immediately downstream from the evaporator coil 120 (or in the suction line) and is generally configured so as to control a primary damper and a bypass damper in such a way as to constrain the temperature of the air that has just passed over the evaporator coil 120 to be the same as the temperature of the refrigerant that has just exited the evaporator coil 120. This ensures that the refrigerant leaves the evaporator coil 120 at a temperature sufficiently low to cool the compressor 127, and yet that the pressure in the evaporator coil 120 is maintained at a level so that the compressor 127 continues to operate within its load tolerances. This configuration is also contemplated for the present invention, where a fixed speed diverter blower 123 is used.

The refrigeration circuit 128 of the present invention works in the ordinary manner as is well known in the art. That is, relatively low pressure/low temperature gaseous refrigerant is introduced into a compressor 127, which compresses the refrigerant into a high pressure/high temperature gas (compressing a given volume of gas into a smaller volume of gas causes its pressure and temperature to increase). The compressed high pressure/high temperature gas is then forced through the condenser 122 which is in located within the high-temperature enclosure 200, whereupon the refrigerant gas gives up some of its heat energy as it is condensed in the condenser 122, and the refrigerant becomes liquefied. The liquid refrigerant is then forced through an expansion device 126 which vaporizes the liquid into a low pressure/low temperature gas. Once the refrigerant has been vaporized into a low pressure/low temperature gas, it is passed through an evaporator coil 120. Heat energy is drawn from the ambient air by the refrigerant, which is then introduced to the compressor 127, repeating the cycle. In the present invention, the refrigerant used is a high critical temperature refrigerant capable of being used at the low critical pressures used in conventional refrigeration equipment. Examples of such refrigerants include R245fa (1,1,1,3,3-pentafluoropropane), Chemours Company's Opteon MZZ™ (R1336mzzZ) ((Z)-1,1,1,4,4,4-hexaflouro-2-butene), and R1336mzz-E ((E)-1,1,1,4,4,4-hexaflouro-2-butene). Other similar refrigerants having these properties may also be used.

In the preferred embodiment, the refrigerant used in the refrigeration circuit 128 can absorb so much heat energy that even after it is condensed into a liquid and dissipates heat into the drying chamber 200, it still retains a significant amount of heat energy. The expansion device 126 cannot efficiently vaporize the refrigerant when it contains so much heat energy. Therefore, as is known in the art, a first sub-cooler 301 is interposed between the condenser 122 and the expansion device 126. Additional heat energy is dissipated from the refrigerant by the first sub-cooler 301. In prior art refrigeration circuits, when a sub-cooler is used, the excess heat is wasted, being dissipated away from the evaporator. That is because the evaporator is used to provide cooling, and bringing excess heat into proximity with the evaporator diminishes its effectiveness. However, in the present invention, it is the drying aspect of the refrigeration circuit 128 that is desired, not any cooling aspect. Therefore, unlike in prior art refrigeration circuits, the first sub-cooler 301 of the present invention is placed in proximity to the evaporator coil 120, namely, within the dewatering chamber 201. Thus, the excess heat energy extracted from the refrigerant by the first sub-cooler 301 is added to the heated air that is vented back into the drying chamber 200 through the return duct 124. This helps keep the temperature in the drying chamber 200 at the desired high levels.

Notwithstanding the efficiency of reusing the heat energy extracted from the refrigerant by the first sub-cooler 301 for maintaining the high temperatures of the drying chamber 200, the ambient temperature of the dewatering chamber 201 cannot exceed the working limit of the evaporator coil 120. That is, when the ambient air temperature within the dewatering chamber 201 exceeds the dew point, no further moisture will be removed from the air when the refrigerant is passed over the evaporator coil 120. Thus, the amount of heat energy that can be extracted from the refrigerant by the first sub-cooler 301 is limited. However, depending on the moisture content of the ambient air as well as the air flow between the drying chamber 200 and the dewatering chamber 201, there may still be too much heat energy in the refrigerant for the expansion device 126 to properly function, even after heat is dissipated by the first sub-cooler 301. Therefore, the present invention incorporates a second sub-cooler 302, which is interposed between the first sub-cooler 301 and the expansion device 126. Like the first sub-cooler 301, the second sub-cooler 302 dissipates heat energy from the refrigerant. Unlike the first sub-cooler 301, though, the second sub-cooler 302 cannot be located proximate to the evaporator coil 120, but rather is located outside of the dewatering chamber 201. Thus, any additional heat energy dissipated by the second sub-cooler 302 does not increase the ambient air temperature in the dewatering chamber 201.

Because the temperature and pressure of the refrigerant coming from the condenser 122 varies, there may not be a need for the second sub-cooler 302 to extract any additional heat energy from the refrigerant in order for the expansion device 126 to properly function. Therefore, the refrigeration circuit 128 also comprises a temperature sensor 130 proximate to the expansion device 126 to determine the temperature of the refrigerant. If the temperature of the refrigerant is determined to be sufficiently low by the temperature sensor 130 after having heat energy extracted therefrom by the first sub-cooler 301, no further heat energy needs to be extracted. In that case, the second sub-cooler 302 may be bypassed, or else otherwise limited in the amount of heat that it extracts from the refrigerant. In one embodiment, the second sub-cooler 302 comprises a fan; when the fan is operational a greater amount of heat energy is extracted from the refrigerant, and when the fan is not operating little or no heat energy is extracted from the refrigerant. On the other hand, if the temperature of the refrigerant is determined to be still too high by the temperature sensor 130 after having heat energy extracted therefrom by the first sub-cooler 301, additional heat energy will be extracted from the refrigerant by the second sub-cooler 302, either by avoiding the bypass or by operating the fan, depending on the configuration of the second sub-cooler 302. The dynamic control of the second sub-cooler 302 based on inputs from the temperature sensor 130 allows for the highest amount of heat energy to be reused in the drying cycle, with the least amount lost as waste heat. This feature of the present invention—the use of a proximate first sub-cooler 301 to extract and reuse heat energy and a dynamically controlled distal second sub-cooler 302 to extract and vent off excess heat energy, as controlled by a temperature sensor 130, is unknown in the prior art and allows the present invention to efficiently maintain higher operating temperatures in the drying chamber 200.

The present invention may further including a supplemental heater 320 to pre-heat the air within the high-temperature enclosure, or the product placed therein for drying, or both. Pre-heating increases the startup efficiency of the system 1.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:

1. A dehumidification dryer comprising
a high-temperature enclosure;
a dewatering enclosure that is separate from said high-temperature enclosure;
an exit duct providing a means of egress for air from inside said high-temperature enclosure into said dewatering enclosure;
a refrigeration circuit that operates with a high-temperature refrigerant having a saturation temperature of at least 280 degrees Fahrenheit and a saturation pressure not exceeding 400 p.s.i., said refrigeration circuit including
an evaporator coil located within said dewatering enclosure,
a compressor located outside said dewatering enclosure,
a condenser located within said high-temperature enclosure,
a first sub-cooler located within said dewatering enclosure,
a second sub-cooler located outside said dewatering enclosure, and
an expansion device located outside said dewatering enclosure; and
a means for directing moist air to be dewatered from said high-temperature enclosure onto said evaporator coil, said means for establishing a flux of said moist air, and wherein said flux is thereby correlated with a refrigerant temperature at a selected point in said refrigeration circuit.

2. The dehumidification dryer as described in claim 1 wherein said means of directing moist air comprises configuring said exit duct to have an evaporator-coil end, wherein said evaporator-coil end of said exit duct is inside said dewatering enclosure and in close proximity to said evaporator coil, and wherein a variable-speed diversion blower is mounted within a return duct, said return duct providing a communication from said dewatering enclosure to said high-temperature enclosure, said diversion blower capable of drawing air from said high-temperature enclosure through said exit duct into said dewatering enclosure, past said evaporator coil, and back to said high-temperature enclosure through said return duct.

3. The dehumidification dryer as described in claim 1 wherein said means of directing moist air comprises a diversion damper and a bypass damper, wherein said diversion damper allows a first fraction of said air from said high-temperature enclosure to be directed onto said evaporator coil and wherein said bypass damper allows a second fraction of said air from said high-temperature enclosure to bypass said evaporator coil.

4. The dehumidification dryer as described in claim 1 also including a return duct for conveying dewatered air from said dewatering enclosure into said high-temperature enclosure, wherein said dewatered air includes substantially all of said moist air from said high-temperature enclosure after some or all of said moist air has passed over said evaporator coil.

5. The dehumidification dryer as described in claim 4 further including one or more drying-air circulation fans for circulating said dewatered air into and through said objects to be dried in said high-temperature enclosure.

6. The dehumidification dryer as described in claim 1 further comprising an evaporator-coil-to-compressor line, a compressor-to-condenser line, and a condenser-to-first-sub-cooler-to-second-sub-cooler-to-evaporator coil line, wherein said evaporator-coil-to-compressor line permits said refrigerant to flow from said evaporator coil to said compressor, wherein said compressor-to-condenser line permits said refrigerant to flow from said compressor to said condenser, and wherein said condenser-to-first-sub-cooler-to-second-sub-cooler-to-evaporator coil line permits said refrigerant to flow from said condenser to said evaporator coil.

7. The dehumidification dryer as described in claim 1 wherein said compressor is located outside of both said high-temperature enclosure and said dewatering enclosure.

8. The dehumidification dryer as described in claim 1 configured as a kiln for drying lumber in said high-temperature enclosure.

9. The dehumidification dryer as described in claim 8 configured to receive said lumber divided into longitudinal elements wherein said high-temperature enclosure includes a platform for supporting said longitudinal elements arrayed in a porous stack, such that dewatered air is circulatable through and around said longitudinal elements.

10. The dryer as described in claim 8 further including a supplemental heater to pre-heat said lumber before activating said dehumidification dryer.

11. The dryer as described in claim 1 further including a supplemental heater to pre-heat said moist air within said high-temperature enclosure.

12. The dehumidification dryer as described in claim 1 wherein said refrigerant is 1,1,1,3,3-pentafluoropropane (R245fa).

13. The dehumidification dryer as described in claim 1 wherein said refrigerant is (Z)-1,1,1,4,4,4-hexaflouro-2-butene (R1336mzzZ).

14. The dehumidification dryer as described in claim 1 wherein said refrigerant is R1336mzz-E ((E)-1,1,1,4,4,4-hexaflouro-2-butene).

15. The dehumidification dryer as described in claim 1 wherein said dewatering enclosure is located outside of said high-temperature enclosure.

16. The dehumidification dryer as described in claim 1 wherein said dewatering enclosure is located within said high-temperature enclosure, said dewatering enclosure being thermally isolated from said high-temperature enclosure by the use of insulation.

17. A dehumidification dryer comprising
a high-temperature enclosure;
a dewatering enclosure that is separate from said high-temperature enclosure;
an exit duct providing a means of egress for air from inside said high-temperature enclosure into said dewatering enclosure;
a return duct for conveying dewatered air from said dewatering enclosure into said high-temperature enclosure;
one or more drying-air circulation fans for circulating said dewatered air into and through objects to be dried in said high-temperature enclosure;
a refrigeration circuit that operates with a high-temperature refrigerant having a saturation temperature of at least 280 degrees Fahrenheit and a saturation pressure not exceeding 400 p.s.i., said refrigeration circuit including
an evaporator coil located within said dewatering enclosure,
a compressor located outside said high-temperature enclosure and outside said dewatering enclosure,
a condenser located within said high-temperature enclosure,
a first sub-cooler located within said dewatering enclosure,
a second sub-cooler located outside said high-temperature enclosure and outside said dewatering enclosure,
an expansion device located outside said dewatering enclosure
an evaporator-coil-to-compressor line, wherein said evaporator-coil-to-compressor line permits said refrigerant to flow from said evaporator coil to said compressor,
a compressor-to-condenser line, wherein said compressor-to-condenser line permits said refrigerant to flow from said compressor to said condenser, and
a condenser-to-evaporator coil line, wherein said condenser-to-evaporator coil line permits said refrigerant to flow from said condenser to said evaporator coil; and
a means for directing moist air to be dewatered from said high-temperature enclosure onto said evaporator coil, said means for establishing a flux of said moist air, wherein said flux is thereby correlated with a refrigerant temperature at a selected point in said refrigeration circuit, said means comprising configuring said exit duct to have an evaporator-coil end, wherein said evaporator-coil end of said exit duct is inside said dewatering enclosure and in close proximity to said evaporator coil, and wherein a variable-speed diversion blower is mounted within said return duct, said return duct providing a communication from said dewatering enclosure to said high-temperature enclosure, said diversion blower capable of drawing air from said high-temperature enclosure through said exit duct into said dewatering enclosure, past said evaporator coil, and back to said high-temperature enclosure through said return duct.

18. A dehumidification dryer comprising
a high-temperature enclosure;
a dewatering enclosure that is separate from said high-temperature enclosure;
an exit duct providing a means of egress for air from inside said high-temperature enclosure into said dewatering enclosure;
a return duct for conveying dewatered air from said dewatering enclosure into said high-temperature enclosure;
one or more drying-air circulation fans for circulating said dewatered air into and through objects to be dried in said high-temperature enclosure;
a refrigeration circuit that operates with a high-temperature refrigerant having a saturation temperature of at least 280 degrees Fahrenheit and a saturation pressure not exceeding 400 p.s.i., said refrigeration circuit including
an evaporator coil located within said dewatering enclosure,
a compressor located outside said high-temperature enclosure and outside said dewatering enclosure,
a condenser located within said high-temperature enclosure,
a first sub-cooler located within said dewatering enclosure,
a second sub-cooler located outside said high-temperature enclosure and outside said dewatering enclosure,
an expansion device located outside said dewatering enclosure
an evaporator-coil-to-compressor line, wherein said evaporator-coil-to-compressor line permits said refrigerant to flow from said evaporator coil to said compressor,
a compressor-to-condenser line, wherein said compressor-to-condenser line permits said refrigerant to flow from said compressor to said condenser, and a condenser-to-evaporator coil line, wherein said condenser-to-evaporator coil line permits said refrigerant to flow from said condenser to said evaporator coil; and a means for directing moist air to be dewatered from said high-temperature enclosure onto said evaporator coil, said means for establishing a flux of said moist air, wherein said flux is thereby correlated with a refrigerant temperature at a selected point in said refrigeration circuit, said means comprising a diversion blower mounted within the return duct, a diversion damper, and a bypass damper, said diversion blower capable of drawing air from said high-temperature enclosure into said dewatering enclosure, wherein said diversion damper allows a first fraction of said air from said high-temperature enclosure to be directed onto said evaporator coil and wherein said bypass damper allows a second fraction of said air from said high-temperature enclosure to bypass said evaporator coil.

* * * * *